United States Patent Office 3,339,901
Patented Sept. 5, 1967

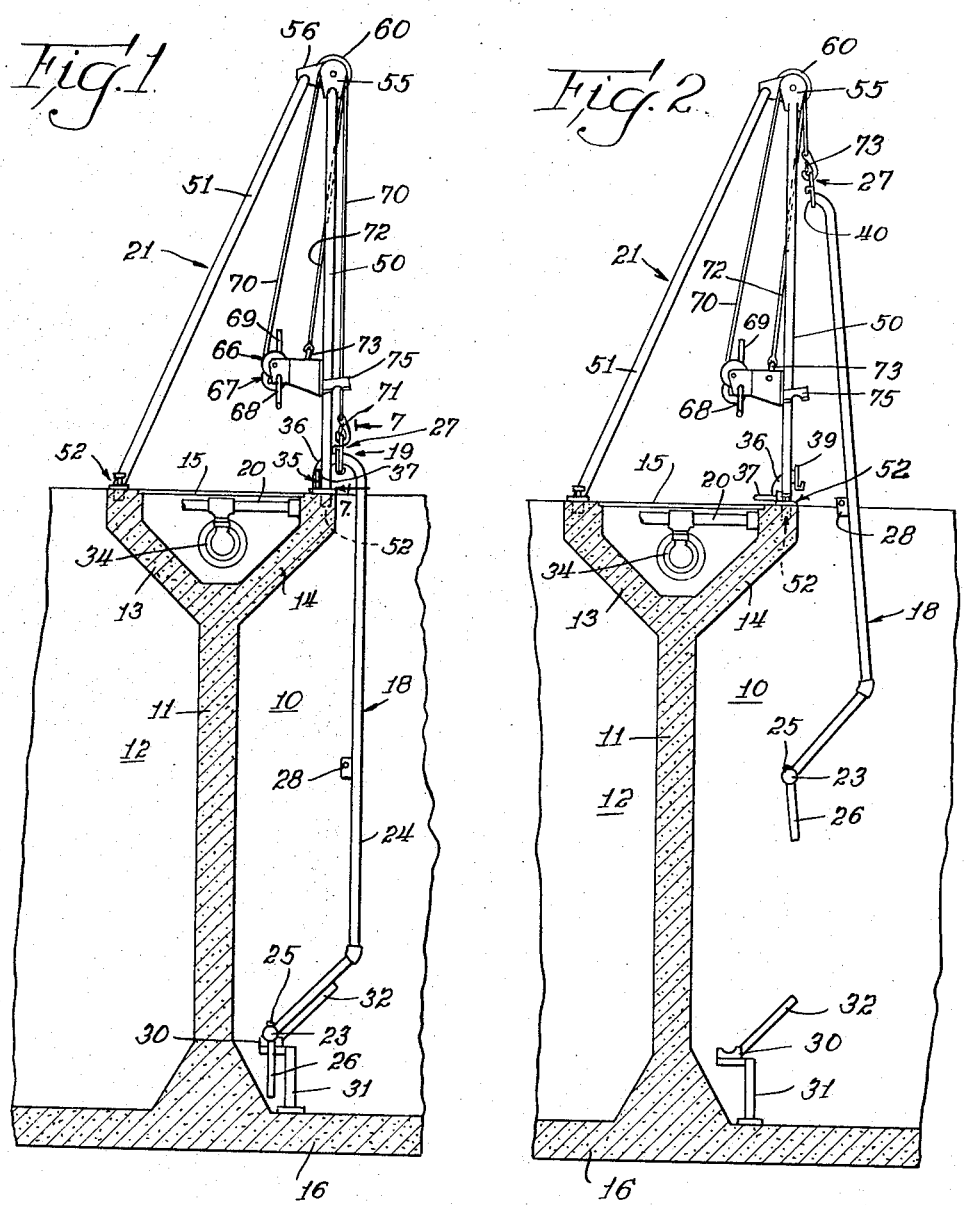

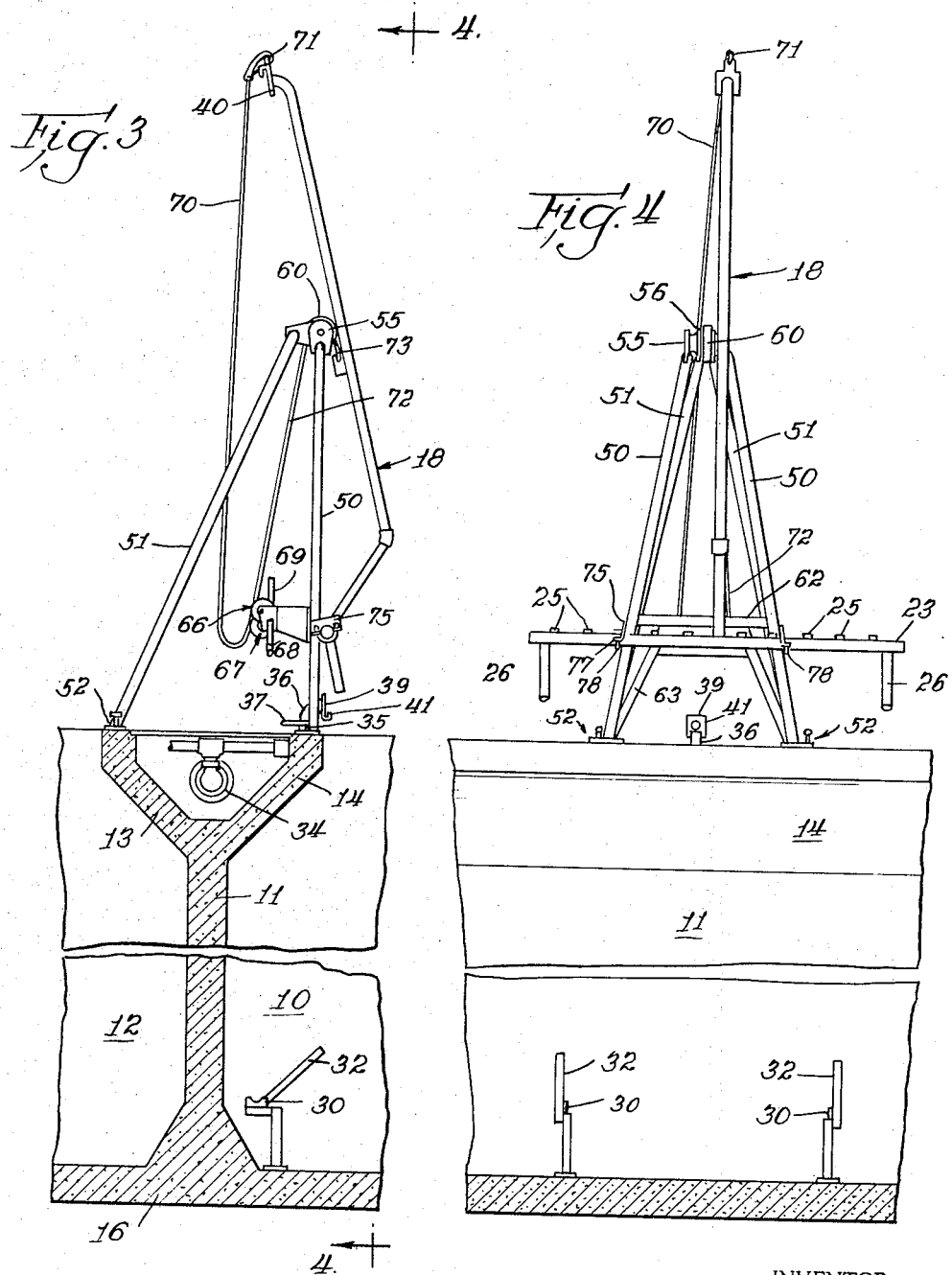

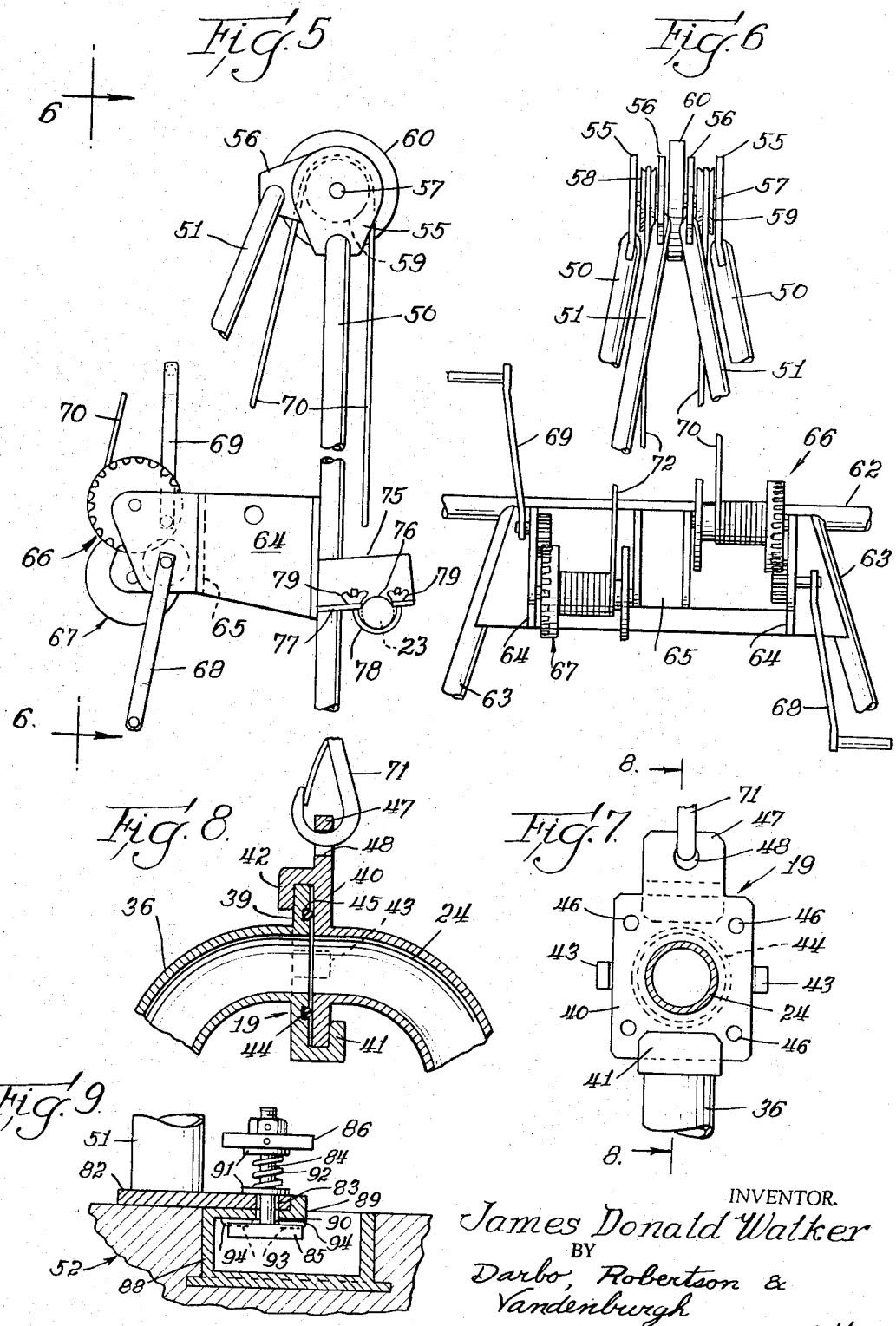

3,339,901
AERATION EQUIPMENT WITH EASY-RAISING FACILITIES
James Donald Walker, Aurora, Ill., assignor, by mesne assignments, to Chicago Bridge & Iron Company, Chicago, Ill., a corporation of Illinois
Filed Mar. 29, 1963, Ser. No. 268,980
11 Claims. (Cl. 261—124)

This invention relates to equipment for the aeration of sewage and the like, and the following disclosure is offered for public dissemination if a patent is issued.

According to common practice for many, many years, one or more of the steps involved in treatment of sewage and industrial wastes has included the liberation of air through diffuser elements at or near the bottom of a treatment tank. In almost all instances prior to 1955 and probably in most instances even now, the air is liberated through a porous diffuser (a plate or tube) which was quite subject to clogging problems. The modern version of the porous tube is a perforated metal tube around which Saran cord is wound; and although this is supposed to be more easily cleaned than the older ceramic type of porous tube, it still presents a severe clogging problem. Porous media was deemed necessary for releasing fine bubbles so that efficient aeration would be achieved.

Since about 1941, almost all porous tubes used in aeration of liquids have been mounted on "swing diffusers" which permitted a swinging movement of the piping to raise the tubes out of the tank for convenient access from the walk-way along the side of the tank, so that the tubes could be removed and taken to a cleaning plant. Since 1941, the swing diffusers have included two pivoted joints in each downwardly extending air supply pipe, the resulting "knee-action" greatly facilitating the raising of the headers carried at the bottom of this downpipe, and on which the tubes were mounted and from which they received their air.

About 1955 the present applicant invented a system of efficient aeration using large-orifice spargers instead of porous media with the result that clogging was substantially eliminated as to many installations and greatly reduced as to others. These need attention so rarely that many of them were installed on headers which were not provided with the "swing diffuser" mountings. Some of these could be raised by uncoupling the air pipe or riser leading to the header, at its upper end, and using the pipe for hoisting the header. A cradle was provided which would guide the header to the proper place upon lowering it after the spargers had been inspected, and cleaned if necessary.

Other spargers have been mounted on fixed headers, with no provision for raising them. In a large sewage treatment plant where there are quite a few aeration tanks, there is no great difficulty in interrupting the use of one, and draining or de-watering it for a few days, while the spargers at the bottom of the tank are inspected and, if necessary, cleaned.

However, many consulting engineers designing sewage treatment plants for cities have insisted on having swing diffusers even if spargers were going to be used. This may have been partly due to a disbelief that spargers would really need as little attention as they do, or it may have been in recognition of the fact that plant operators like to be able to inspect their equipment easily and often, if only to make sure that it does not need cleaning. Furthermore, it is difficult to be certain in advance that a given plant will not prove to be one of the rare instances in which even spargers give appreciable clogging trouble, though much less than porous diffusers.

Swing diffusers with their two pivoted joints are expensive. It has long been recognized that this cost is wasteful in the case of spargers, even though it has seemed fully justified for porous tubes.

According to the present invention, the problem is solved by a system which makes the aeration assemblies removable almost as easily as swing diffusers, even though they include no pivot units and hence their cost is substantially that of stationary piping. Although they are intended especially for spargers, their ease of operation is such that they are also practical for use with porous diffusers.

According to the present invention, the riser or downpipe leading to the header is rigid but can be uncoupled at the top, and it has cable attaching eyes secured to it at its top and at a mid-height. A crane or hoist is provided which has two winch-and-cable sets. The first cable is attached to the upper eye, and the winch is turned to raise the riser with its attached header and spargers until the lower eye is accessible. The second cable is then attached to the lower eye, its winch is turned to raise the aerating assembly further until its header is at a convenient position resting on the frame of the crane, preferably at least hip high. In this position the spargers can be easily inspected or cleaned, and the header itself forms a guardrail, protecting the workmen against accidentally falling into the tank.

Further objects and advantages will be apparent from the following description taken in conjunction with the drawings in which:

FIGURE 1 is a sectional view through a pair of sewage treatment tanks and illustrating an embodiment of the invention employed therewith;

FIGURE 2 is a view corresponding to FIGURE 1 and illustrating the partial removal of the air diffuser means from the tank;

FIGURE 3 is a view corresponding to FIGURES 1 and 2 (partially broken) and illustrating the complete removal of the air diffuser means from the tank;

FIGURE 4 is a view as seen at line 4—4 of FIGURE 3;

FIGURE 5 is an enlarged fragmentary elevation of the lifting apparatus as viewed in FIGURE 1;

FIGURE 6 is a fragmentary elevational view as seen at lines 6—6 of FIGURE 5;

FIGURE 7 is an enlarged partial section as viewed at line 7—7 of FIGURE 1;

FIGURE 8 is a section as viewed at line 8—8 of FIGURE 7; and

FIGURE 9 is a sectional elevation of the mounting means for the lift apparatus.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventve concepts are found.

Referring to FIGURES 1-4, the present invention is employed in conjunction with a sewage treatment tank 10. In the illustrated embodiment, wall 11 of tank 10 is a common wall between tank 10 and an adjacent tank 12. The top of wall 11 is in the form of a "Y" having a pair of arms 13 and 14. A plate or grating 15 forms a top walkway between the arms 13 and 14. The tanks also include a base 16 and other walls (not shown) which define the remainder of the tank.

The present invention comprises an air diffuser means generally 18, a releasable coupling generally 19 connecting the air diffuser means to an air supply line 20, and a lift apparatus generally 21.

Air diffuser means

The air diffuser means 18 includes a header 23 which is positioned substantially horizontally adjacent the bottom of tank 10. An air riser pipe 24 communicates with header 23 to supply air to the header as hereinafter described. At spaced distances along header 23 are a plurality of spargers 25 through which the air is released and diffused into the liquid in the tank. Open-bottom water-seal tubes 26 communicate with header 23 and extend downwardly therefrom. A first lift connection 27 (structurally a part of coupling 19) is secured to riser pipe 24 above the liquid level in the tank and at a position easily accessible to one standing on the top of wall 11. A second lift connection 28 is affixed to riser pipe 24 at an elevation approximately half way between the first lift connection and header 23.

To properly position the air diffuser means in the tank, there are provided a pair of saddles 30 affixed to supports 31 mounted on base 16 of the tank. Alignment guides 32 also are attached to supports 31 and extend angularly in a generally upward direction.

Coupling

The air diffuser means 18 is only one of a number that are employed for the aeration of sewage in both tanks 10 and 12. Air is supplied to each of these from a suitable source (not shown). The air supply includes various main conduits 34 and branch lines 20 to each of the air diffuser means from the main conduit. Each branch line 20 includes an air control valve 35 and an elbow 36. Air valve 35 has an operating handle 37 which is turned to open or close valve 35. Elbow 36 is fixedly mounted on wall 11.

Coupling 19 includes a flange 39 secured to elbow 36 and a flange 40 secured to riser pipe 24, as seen best in FIGS. 7 and 8. Flange 39 has a bottom reentrant portion defining a saddle 41 which supports and aligns flange 40. Flange 40 has a hooked finger 42 which seats about the top of flange 39. At the opposite sides of flange 39 are abutments 43 to align the two flanges in a transverse direction. An O-ring 44 is received in a groove 45 in flange 39. If desired, an adhesive or cement may be employed to ensure that O-ring 44 remains in groove 45 when the coupling is disconnected. Bolt holes 46 are provided through flanges 39 and 40. The air pressure in the pipes at coupling 19 is relatively low and normally O-ring 44 will provide a sufficient seal without the flanges being bolted together. However, bolt holes are provided since some users may prefer to more securely connect the two flanges 39 and 40. Flange 40 has a tab 47 that extends upwardly and has a hole 48 therein. This structure provides the first lift connection 27 of the air diffuser means, previously mentioned.

Lift apparatus

The lift apparatus seen in FIGS. 1 to 5 and 6 includes a pyramidal frame defined by two front legs 50 and two rear legs 51. In the main the frame is formed of aluminum to reduce its weight and make it easy to handle. Mounting means 52 are provided for the quick and easy, but secure, mounting of each leg of the lift apparatus in the proper position for the removal of the air diffuser means.

Plates 55 are secured to the top of legs 50. Plates 56 are secured to the top of legs 51. A shaft 57 is mounted on and extends between all of plates 55 and 56. Shaft 57 is secured to plates 55 and journaled in plates 56. Sheaves 58 and 59 are journaled on shaft 57 as is a wheel 60.

A crossbar 62 extends between legs 50 along the working face of the lift apparatus, adjacent the tank. A pair of braces 63 also connect cross bar 62 with legs 50. A pair of brackets 64 are affixed to crossbar 62 and braces 63 and to a mounting plate 65. Two geared winches generally 66 and 67 (FIG. 6) are attached to mounting plate 65. Winch 66 has an operating crank 68. Similarly winch 67 has a crank 69. From the drum of winch 66 a cable 70 extends about sheave 59 and terminates at a lifting hook 71. Similarly a cable 72 extends from the drum of winch 67 about sheave 58 and terminates in a lifting hook 73. Hooks 71 and 73 should be of the positive engagement type so that they will not become accidentally disconnected during use, but can be intentionally disconnected when desired.

Extending forwardly from legs 50 are a pair of arms 75. Arms 75 define a downwardly facing socket 76 with flanges 77 at opposite sides thereof. U-bolts 78 extend through openings in flanges 77 with wing nuts 79 being threaded onto U-bolts 78.

The mounting means 52 is illustrated in FIGURE 9. As will be seen, each leg, such as leg 51, is affixed to a respective base plate 82. Base plate 82 has a circular hole 83 in which is rotatably received a shaft 84. The bottom of shaft 84 has a T-head 85 and the top has a T-handle 86.

A socket member 88 is embedded in the top of wall 11. Socket member 88 has a supporting shelf 89 with an elongated slot 90 therein. The length of slot 90 is slightly greater than the length of head 85. Thus, when head 85 is turned parallel to slot 90, the head will be movable vertically through the slot. Encircling shaft 84 are washers 91 and spring 92. Grooves 93 on the top of head 85 are of a size to receive tongues 94 on the underside of shelf member 88.

When the frame including the legs 50 and 51 is put into place, handles 86 and heads 85 all are aligned with slots 90 in the socket member. Then by compressing spring 92, head 85 may be rotated 90° to the position illustrated in FIGURE 9 at which point the pressure on spring 92 is released. Each leg thus is locked in place on the top of wall 11. The reverse movements will disengage each leg from wall 11.

It is apparent that the two front legs 50 and the two rear legs 51 provide a pyramidal structure with four faces. The face which is more nearly vertical, toward which the sheaves 58 and 59 pay out their respective cables, and toward which the projecting arms 75 extend, may for convenience be called the working face.

Operation

FIGURE 1 illustrates the position of the air diffuser means 18 when it is in operation in the tank. Valve 35 is open. The air under relatively low pressure is introduced through riser pipe 24 to header 23. From header 23 the air is released into the liquid in the tank through spargers 25. The pressure at header 23 is sufficiently low so that the liquid will partially fill pipes 26 under normal conditions.

When one of the air diffuser means is to be removed from the tank for inspection, cleaning, etc., the lift apparatus 21 is moved to the proper position opposite the diffuser means to be removed, with its working face adjacent the tank. The lift apparatus is so devised that one man can put it into position. Rear legs 51 will fold (by rotation about shaft 57) against front legs 50. Using wheel 60, the man can wheel the frame in wheelbarrow-fashion to the required position. At that position, legs 50 and 51 are engaged with wall 11 by their respective mounting means 52.

Air valve 35 is closed by moving handle 37. One of the lifting devices is connected to the upper lift connection 27. For example, in the drawings, hook 71 from winch 66 is inserted through opening 48 of tab 47. If bolts have been inserted through openings 46, these are now removed. Handle 68 of winch 66 is rotated, winding cable 70 onto the drum of the winch. The air diffuser means is thereby raised to approximately the position illustrated in FIGURE 2. When the second lift connection 28 is above the liquid and within easy reach of the workman, the other lifting device is connected to the second lift connection 28. Thus, hook 73 from winch 67 would be engaged into the opening of the second lifting connection 28. Thereafter handle 69 is rotated to operate winch 67 and continue the raising of the air diffuser means to the FIGURE 3 position. At this position, header 23 has been moved into socket 76, so that U-bolts 78 (which would have been removed before raising the air diffuser means) may be slipped around the header. Wing nuts 79 are affixed to the U-bolts to securely hold the air diffuser means in the raised position of FIGURES 3 and 4. It will be noted that in this position header 23 forms a guard rail for the workman who may be servicing the air diffuser means.

The foregoing procedure is reversed in returning the air diffuser means to the tank. After disconnecting U-bolts 78, winch 67 is operated to lower the air diffuser means to approximately the FIGURE 2 position. At this latter position, the air diffuser means will be supported by cable 70 from winch 66 and hook 73 is removed from connection 28. Thereafter winch 66 is operated to continue the lowering of the air diffuser means into the tank. As the air diffuser means approaches its terminal position, guides 32 contact header 23 to direct the header into saddles 30. During the final downward movement of the air diffuser means, flange 40 is seated in saddle 41 with finger 42 hooking about the top of flange 39. With the two flanges 39 and 40 thus seated together, sufficient contact will be obtained on O-ring 44 to provide an air-tight seal in the usual instance. However, if desired, bolts may be inserted through bolt holes 46 and tightened to further compress O-ring 44. Hook 71 now is disconnected from upper connection 27. Valve 35 is reopened to put the air diffuser means back into operation. Lifting apparatus 21 now may be moved to another location for the inspection or servicing of another of the air diffuser means.

I claim:

1. Apparatus for use in connection with a sewage treatment plant having a treatment tank and an air supply line, said apparatus including: air diffuser means in said tank ad having a rigid air riser pipe extending upwardly from deep in the tank to the side of the tank above the surface of the liquid in the tank, a first lift connection on said pipe above the liquid surface, and a second lift connection on the pipe a substantial distance below the first connection; a quick-release coupling between the rigid pipe and line for the supply of air to the diffuser means; and a lift apparatus adapted to be positioned with a working face exposed to, and at the side of, the tank adjacent said diffuser means and including two closely associated lift devices each capable of a lifting movement of less than the vertical dimension of the pipe, each device having connecting means; whereby said diffuser means may be quickly and easily removed from said tank by releasing said coupling, positioning said lift apparatus at the side of the tank adjacent said riser pipe, engaging the connecting means of one device with the first connection, raising the diffuser means with the one device, while the other lift device remains disconnected, to a position at which the second lift connection is above the liquid and within reach, engaging the connecting means of the other lift device with the second connection, and completing the raising of the diffuser means with the other device.

2. Apparatus for use in connection with a sewage treatment plant having a treatment tank and an air supply line, said apparatus including: a plurality of air diffuser means in said tank each having a rigid air riser pipe extending upwardly from deep in the tank to the side of the tank above the surface of the liquid in the tank, a first lift connection on said pipe above the liquid surface, and a second lift connection on the pipe a substantial distance below the first connection; a quick-release coupling between each rigid pipe and the line for the supply of air to the diffuser means; and a lift apparatus adapted to be positioned with a working face exposed to, and at the side of, the tank adjacent each of said diffuser means and including two lift devices near said face and substantially the same distance from a vertical line at one edge of said face each capable of a lifting movement of less than the vertical dimension of the pipe, each device having connecting means; whereby any one of said diffuser means may be quickly and easily removed from said tank by releasing the respective coupling, positioning said lift apparatus at the side of the tank adjacent said riser pipe of the diffuser means to be removed from the tank, engaging the connecting means of one device with the first connection of said riser pipe, raising the diffuser means with the one device, while the other lift device remains disconnected, to a position at which the second lift connection is above the liquid and within reach, engaging the connecting means of the other lift device with the second connection, and completing the raising of the diffuser means with the other device.

3. Apparatus for use in connection with a sewage treatment plant having a treatment tank and an air supply line, said apparatus including: a plurality of air diffuser means in said tank each having a rigid air riser pipe extending upwardly from deep in the tank to the side of the tank above the surface of the liquid in the tank, a first lift connection on said pipe above the liquid surface, and a second lift connection on the pipe a substantial distance below the first connection; a quick-release coupling between each rigid pipe and the line for the supply of air to the diffuser means; and a lift apparatus adapted to be positioned with a working face exposed to, and at the side of, the tank adjacent each of said diffuser means and including a generally pyramidal frame having a wheel and two sheaves at the apex thereof, and two winches on said frame each having connecting means; whereby any one of said diffuser means may be quickly and easily removed from said tank by releasing the respective coupling, positioning said lift apparatus at the side of the tank adjacent said riser pipe of the diffuser means to be removed from the tank, engaging the conecting means of one winch with the first connection, raising the diffuser means with the one winch, while the other winch remains disconnected, to a position at which the second lift connection is above the liquid and within reach, engaging the connecting means of the other winch with the second connection, and completing the raising of the diffuser means with the other winch.

4. Apparatus for use in connection with a sewage treatment plant having a treatment tank and an air supply line, said apparatus including: a plurality of air diffuser means in said tank each having a generally horizontal header adapted to be positioned adjacent the bottom of the tank, a rigid air riser pipe connected to the header and extending upwardly therefrom to the side of the tank above the surface of the liquid in the tank, a first lift connection on said pipe above the liquid surface, and a second lift connection on the pipe approximately midway between the header and the first connection; a quick-release coupling between the rigid pipe and line for the supply of air to the diffuser means; a cradle for each diffuser means adapted to be mounted in said tank to contact the header and thereby support the respective diffuser means and to position it as it is lowered while hanging by its first lift connection; and a lift apparatus adapted to be positioned with a working face exposed to, and at the side of, the tank adjacent each of said diffuser means and including a generally pyramidal frame having a wheel and two sheaves at the apex thereof, and two winches on said frame each having connecting means, said sheaves being positioned at an elevation above the first connecting means a distance less than the length between the first connecting means and the header and greater than one-half said length; whereby any one of said diffuser means may be quickly and easily removed from said tank by releasing the respective coupling, positioning said lift apparatus at the side of the tank adjacent said riser pipe of the diffuser means to be removed from the tank, engaging the connecting means of one winch with the first connection, raising the diffuser means with the one winch, while the other winch remains disconnected, to a position at which the second lift connection is above the liquid and within reach, engaging the connecting means of the other winch with the second connection, and completing the raising of the diffuser means with the other winch.

5. Apparatus for use in connection with a sewage treatment plant having a treatment tank and an air supply line, said apparatus including: air diffuser means in said tank and having a rigid air riser pipe extending upwardly from deep in the tank to the side of the tank above the surface of the liquid in the tank, a first lift connection on said pipe above the liquid surface, and a second lift connection on the pipe a substantial distance below the first connection; a quick-release coupling between the rigid pipe and line for the supply of air to the diffuser means, said coupling including mating flanges on the pipe and on the line, a saddle on the line flange supporting the pipe flange in alignment with the line flange, and means to releasably hold the flanges together; and a lift apparatus adapted to be positioned with a working face exposed to, and at the side of, the tank adjacent said diffuser means and including two lift devices each capable of a lifting movement of less than the vertical dimension of the pipe, means substantially above the side of the tank to engage and hold the diffuser means when in the raised position to serve as a guard rail, and means to releasably affix the lift apparatus at the side of the tank adjacent the riser pipe, each device having connecting means; whereby said diffuser means may be quickly and easily removed from said tank by releasing said coupling, positioning said lift apparatus at the side of the tank adjacent said riser pipe, engaging the connecting means of one device with the first connection, raising the diffuser means with the one device, while the other lift device remains disconnected, to a position at which the second lift connection is above the liquid and within reach, engaging the connecting means of the other lift device with the second connection, and completing the raising of the diffuser means with the other device.

6. Apparatus for use in connection with a sewage treatment plant having a treatment tank and an air supply line, said apparatus including: a plurality of air diffuser means in said tank each having a generally horizontal header adapted to be positioned adjacent the bottom of the tank, a rigid air riser pipe connected to the header and extending upwardly therefrom to the side of the tank above the surface of the liquid in the tank, a first lift connection on said pipe above the liquid surface, and a second lift connection on the pipe a substantial distance below the first connection; and a quick-release coupling between the pipe and line for the supply of air to the diffuser means; said lift connections being adapted for temporary connection of a lift device.

7. An apparatus for use in removing from a sewage treatment tank an air diffuser means of the type having a rigid air riser pipe with two vertically spaced lift connections and connected by a releasable coupling to an air riser pipe, said apparatus including a generally pyramidal frame having a wheel and two sheaves close to each other at the apex thereof outwardly exposed on a working face of the apparatus which may be exposed to and adjacent to a tank, and two winches on said frace each having connecting means extending over one of said sheaves; whereby said diffuser means may be quickly and easily removed from said tank by releasing said coupling, positioning said frame at the side of the tank adjacent said riser pipe, engaging the connecting means of one winch with the upper connection, raising the diffuser means with the one winch to a position at which the second lift connection is above the liquid and within reach while the other connecting means and winch remain unconnected, engaging the connecting means of the other winch with the second lift connection, and completing the raising of the diffuser means with the other winch.

8. Aeration apparatus for use in connection with a sewage treatment plant having a treatment tank and an air supply line, said apparatus including: air diffuser means in said tank and having a rigid air riser pipe extending upwardly from deep in the tank to the side of the tank above the surface of the liquid in the tank, a first lift connection on said pipe near the top thereof, and a second lift connection on the pipe near the mid level thereof; a quick-release coupling between the rigid pipe and line for the supply of air to the diffuser means; and a lift apparatus adapted to be positioned with one face exposed to, and at the side of, the tank adjacent said diffuser means having a height less than the vertical dimension of the air diffusing means including the pipe and including two closely associated lift devices each capable of a lifting movement substantially along a common line of about half of the vertical dimension of air diffusion means including the pipe, the two lifting devices having lifting elements positioned at substantially the same distance from a vertical line at one end of said face, each device having a connecting means adapted for quick connection to said lift connections; whereby said diffuser means may be quickly and easily removed from said tank by releasing said coupling, positioning said lift apparatus at the side of the tank adjacent said riser pipe, and by operating steps including engaging the connecting means of one device with the first connection, using the one device while the second remains disconnected in raising the diffuser means to a position at which the second lift connection is near the original height of the first and within reach, engaging the connecting means of the other lift device with the second connection, and using said other device in completing the raising of the diffuser means while said one lift device is released to permit this further raising.

9. Aeration apparatus for use in connection with a sewage treatment plant having a treatment tank and an air supply line, said apparatus including: an air diffuser unit having a generally horizontal header adapted to be positioned adjacent the bottom of the tank, a rigid air riser pipe connected to the header and adapted to extend upwardly therefrom to the side of the tank above the surface of the liquid in the tank, a first lift connection on said pipe near the top thereof to be above the liquid surface, and a second lift connection on the pipe about half the vertical dimension of the unit below the first connection; and a fitting at the top of the riser pipe adapted for quick-release coupling above the water level between the pipe and line for the supply of air to the diffuser means; said lift connections being adapted for temporary connection of a lift device, and said header having at an end remote from the riser pipe a tube extending downwardly from the header a sufficient distance to be water sealed during normal air diffusion.

10. Apparatus for use in connection with a sewage treatment plant having a treatment tank and an air supply line, said apparatus including: an air diffuser unit having a generally horizontal header adapted to be positioned adjacent the bottom of the tank, a rigid air riser pipe connected to the header and adapted to extend upwardly therefrom to the side of the tank above the surface of the liquid in the tank, a first lift connection on said pipe near the top thereof to be above the liquid surface, and a second lift connection on the pipe about half the vertical dimension of the unit below the first connection; and a fitting at the top of the riser pipe adapted for quick-release coupling between the pipe and line for the supply of air to the diffuser means; and guiding cradle means for mounting at the bottom of the tank for guiding the header to a predetermined position as the unit is lowered to its coupling position while hanging from the first lift connection.

11. An apparatus for use in removing from a sewage treatment tank an air diffuser means of the type having a rigid air riser pipe with two vertically spaced lift connections and connected by a quick-release coupling to an air supply pipe, said apparatus including an upstanding portable frame adapted to be positioned with a working face exposed to and adjacent to such a tank and having two independent sheaves exposed substantially at said face and close to each other at the top thereof, and two independently operable winches on said frame each having connecting means wound thereon and extending over one of said sheaves; whereby said diffuser means may be quickly and easily removed from said tank by steps including releasing said coupling, positioning said frame at the side of the tank adjacent said riser pipe, engaging the connecting means of one winch with the upper connection, using one winch in raising the diffuser means to a position at which the second lift connection is above the liquid and within reach, engaging the connecting means of the other winch with the second lift connection, and using the other winch in completing the raising of the diffuser means.

References Cited

UNITED STATES PATENTS

| | | | |
|---|---|---|---|
| 348,556 | 9/1886 | Grueninger | 285—67 |
| 1,352,035 | 9/1920 | Smith | 254—245 |
| 1,435,065 | 11/1922 | Holmes. | |
| 2,218,635 | 10/1940 | Borge | 261—122 |
| 2,488,470 | 11/1949 | Gerweck et al. | 285—23 X |
| 2,527,097 | 10/1950 | Katow. | |
| 3,116,021 | 12/1963 | Born. | |
| 3,153,682 | 10/1964 | Walker | 261—124 |

HARRY B. THORNTON, *Primary Examiner.*

E. H. RENNER, *Assistant Examiner.*